UNITED STATES PATENT OFFICE.

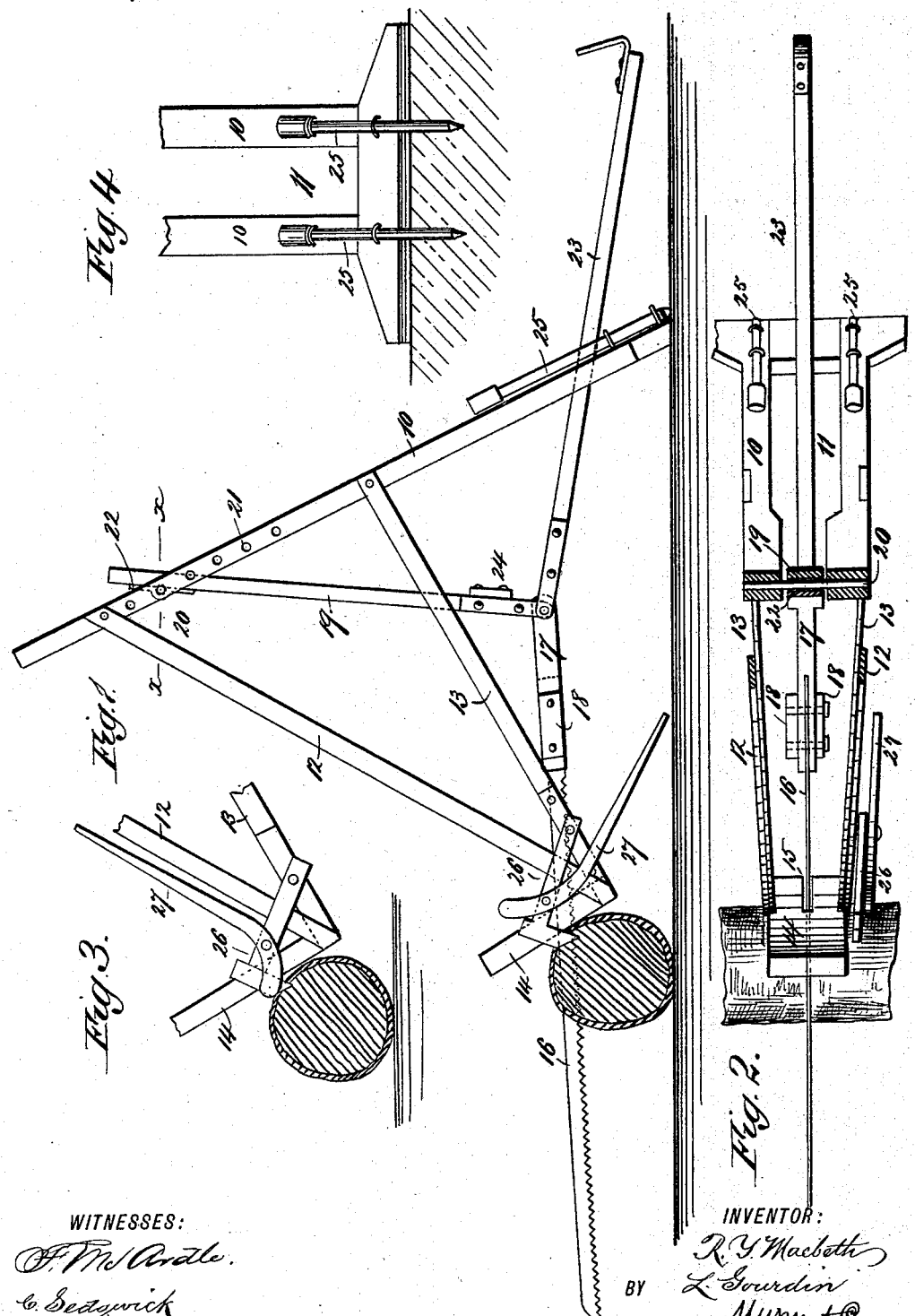

RICHARD YEADIN MACBETH AND LOUIS GOURDIN, OF MONK'S CORNER, SOUTH CAROLINA.

DRAG-SAW.

SPECIFICATION forming part of Letters Patent No. 413,404, dated October 22, 1889.

Application filed November 30, 1888. Serial No. 292,206. (No model.)

*To all whom it may concern:*

Be it known that we, RICHARD YEADIN MACBETH and LOUIS GOURDIN, of Monk's Corner, in the county of Berkeley and State of South Carolina, have invented a new and Improved Drag-Saw, of which the following is a full, clear, and exact description.

Our invention relates to an improvement in drag-saws, and has for its object to provide a saw of simple and durable construction which may be convenietly manipulated, and wherein the dog used in connection with the saw may be readily and expeditiously detached from the log.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a side elevation of the saw. Fig. 2 is a horizontal section on line $x\ x$ of Fig. 1. Fig. 3 is a detail view of the dog and releasing-lever, and Fig. 4 is a detail view of the locking attachment.

In carrying out the invention the frame consists of a rear standard 10, provided with a longitudinal slot 11, spaced parallel beams 12, extending at an inclination forward and downward from the top of the standard, and a second set of intermediate parallel brace-bars 13, attached, respectively, to each side of the standard at or near the center, and also to the forward extremity of the upper inclined beams 12, as best shown in Figs. 1 and 2. The said brace-bars extend forward at a right angle to the standard. Between the forward extremity of the brace-bars a head-block 14 is secured, provided with a vertical guide-slot 15 in the lower end, adapted to receive the saw-blade 16. The saw-blade is provided at the inner end with a shank or extension 17, having a weight 18 attached at each side near the blade, as best shown in Fig. 2. The rear extremity of the extension or shank is pivoted to the lower end of a pendulum-rod 19, which pendulum-rod is journaled in the upper portion of the standard-slot 11. The attachment of the said rod 19 to the frame-standard 10 is adjustable, being effected by passing a pin 20 through one of a series of apertures 21 produced in said standard, and through a suitable box 22, secured to the pendulum-rod, as best illustrated in Figs. 1 and 2. Thus the saw may be raised or lowered, as desired.

The saw is reciprocated by the manipulation of a handle 23, pivoted at the rear of the blade shank or extension 17, which handle is carried rearward through the standard-slot 11. To augment the inertia of the pendulum-rod, a weight 24 is attached thereto at or near the lower end.

Upon the base of the standard 10, at each side of the center, pins or pegs 25 are held to slide and adapted, when the saw is in position, to be driven into the ground, as illustrated in Fig. 4.

Near the outer end of one of the brace-bars 13 a dog 26 is pivoted, which dog is adapted to be driven into the log to be sawed, as shown in Figs. 1 and 3, and upon the outer side of the dog, between the pivotal point and the outer end, the curved end of a releasing-lever 27 is pivoted in such manner that when the free end or handle of the lever is thrown upward the convex surface of the lever will bear upon the log into which the dog has been driven, as shown in Fig. 3. Thus when the handle of the lever is brought to an essentially-vertical position the dog is withdrawn from the log.

In operation, the standard of the frame maintains a forwardly-inclined position, the pendulum-rod hanging essentially perpendicularly downward, as illustrated in Fig. 1. It will be observed by reference to the said Fig. 1 that the saw-frame partakes of the form of a triangle.

Having thus described our invention, what we claim as new, and desire to secure by Letters Patent, is—

1. The combination, with the saw-frame and the saw, of a vertically-swinging log-dog pivoted to the front end thereof, and a rearward-extending releasing-lever pivoted near its front end to the side of the said dog near the front end thereof, whereby when the long arm of the lever is thrown up its short arm will bear down on the log and force the dog upward, substantially as set forth.

2. The combination, with an essentially-triangular frame, a weighted pendulum adjustably pivoted in the frame, and a weighted saw pivoted to said pendulum-rod, of a log-dog pivoted to the frame, and a releasing-lever having a convex engaging-surface pivoted to said dog, substantially as shown and described.

3. The combination, with the frame of a drag-saw, of a log-dog pivoted at the forward end of the frame, a releasing-lever pivoted upon the said dog, having a convex engaging-surface, and locking-pins held to slide upon the rear of the frame at the base, all combined for operation substantially as shown and described.

RICHARD YEADIN MACBETH.
LOUIS GOURDIN.

Witnesses:
E. P. GAILLARD,
S. W. RAMSAY.